Jan. 15, 1963 E. J. CHRZANOWSKI ETAL 3,073,966

GATING CIRCUIT FOR UNIJUNCTION TRANSISTORS

Filed Jan. 23, 1959

INVENTORS
Edward J. Chrzanowski &
Charles L. Layton
BY Maury I. Hull
ATTORNEY

United States Patent Office 3,073,966
Patented Jan. 15, 1963

3,073,966

GATING CIRCUIT FOR UNIJUNCTION TRANSISTORS

Edward J. Chrzanowski, Linthicum, and Charles L. Layton, Glen Burnie, Md., assignors to Westinghouse Electric Corporation, East Pittsburgh, Pa., a corporation of Pennsylvania Filed Jan. 23, 1959, Ser. No. 788,598
10 Claims. (Cl. 307—88.5)

This invention relates to improvements in gating circuits and more particularly to gating circuits for unijunction transistors.

As is known in the art, a unijunction transistor is similar in operation to a thyratron and is used widely as a switching device. Unlike a thyratron, however, once the unijunction transistor is driven into conduction, it is held in conduction by the emitter (analogous to the thyratron grid) current. If this emitter current is reduced or "starved" below a critical value, the transistor is returned to a non-conducting state.

In summary, the apparatus of the instant invention employs a rectifier in conjunction with an R–C network to control the voltage variation limits on the emitter to thereby vary the conductivity of the transistor.

One of the objects of the invention is to provide a new and improved gating circuit.

Another object is to provide a new and improved gating circuit for the unijunction transistor.

Other objects and advantages will become apparent after a perusal of the following specification when read in connection with the accompanying drawings, in which.

Figure 1:
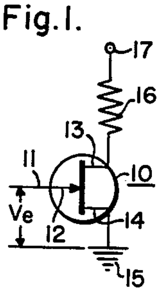
FIGURE 1 is a diagram of a unijunction transistor included to facilitate a description of the invention.

Referring now to the drawings for a more detailed understanding of the invention, in which like reference numerals are used throughout to designate like parts, and in particular to FIG. 1, a unijunction transistor is generally designated by the reference numeral 10 and has an emitter 12 and bases 13 and 14, one of these being connected to ground 15. Emitter 12 is connected to lead 11 whereas base 13 is connected by way of resistor 16 to the terminal 17 of a source of potential, not shown, having the other terminal thereof connected to ground 15. If $V_e$, the voltage between lead 11 and ground 15, is less than the critical value, there is a minimum amount of current flowing through the emitter to base 14 circuit, and this is also true of the base 13 to base 14 circuit. If voltage $V_e$ is made to exceed a critical value, the transistor base to base resistance "breaks down," that is, the resistance between bases 13 and 14 falls to a low value, allowing a significant current in the circuit. This base 13 to base 14 current will persist as long as the emitter current is of sufficient amplitude.

Figure 2:
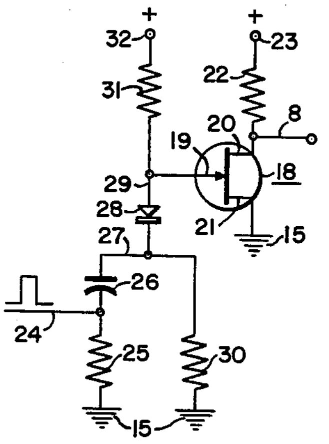
FIG. 2 is a schematic circuit diagram of the invention according to the preferred embodiment thereof.

Particular reference should be made now to FIG. 2. The unijunction transistor 18 has emitter 19 and bases 20 and 21, base 21 being connected to ground 15 and base 20 being connected by way of lead 8 and resistor 22 to the positive terminal 23 of a source of potential, not shown, having the other terminal thereof connected to ground. An input lead 24 is provided connected by way of resistor 25 to ground 15, and input lead 24 is also connected by way of capacitor 26, lead 27, rectifier 28 and lead 29 to emitter 19. Lead 27 is also connected by way of resistor 30 to ground 15. Lead 29 is also connected by way of resistor 31 to the positive terminal 32 of a suitable source of potential, not shown, having the negative terminal thereof connected to ground 15.

In the operation of the circuit of FIG. 2, with constant potentials applied to terminals 32 and 23, resistors 31 and 30 are adjusted to provide a voltage $V_e$ between lead 29 and ground 15 of an amplitude less than the critical value for the emitter of transistor 18, this being easily obtainable by the voltage dividing network of resistors 31 and 30. A positive trigger pulse applied to lead 24 back-biases or cuts off the diode 28 and the voltage $V_e$ on lead 29 rises toward the B+ value at terminal 32. However, before it can reach that value, it crosses the critical emitter voltage of emitter 19 which "fires" the transistor 18. The resistor 31 is made small enough to yield sufficient emitter current to keep the transistor 18 fired. Under these conditions, $V_e$ becomes very small, holding the diode 28 cutoff even after the trigger is removed because of the voltage on capacitor 26. After the trigger pulse is removed, the capacitor 26 discharges through resistor 30 until the voltage reaches the amplitude of $V_e$ at which point the diode 28 starts to conduct, placing this circuit in parallel with the emitter circuit. This condition "starves" the emitter circuit, returning the transistor 18 to its "unfired" state until the next trigger pulse occurs. The circuit of FIG. 2 may be said to resemble a monostable multivibrator whose unstable period is controlled by the time constant of resistors 25 and 30 and capacitor 26.

Figure 3:
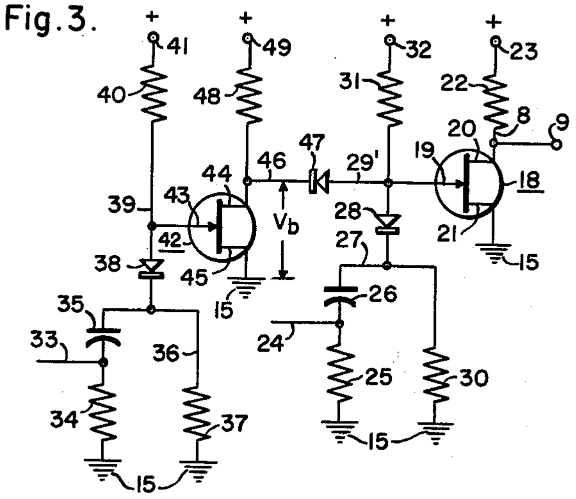
FIG. 3 is a schematic circuit diagram according to a second embodiment of the invention.

Particular attention should be paid now to FIG. 3. The right-hand side of the circuit of FIG. 3 is seen to be substantially identical to that of FIG. 2 except that the lead connecting rectifier 28 to emitter 19 is designated 29′ in FIG. 3 for the reason that this lead has another element connected thereto as will appear hereinafter. On lead 24 a series of spaced pulses are applied as represented by pulses *x*, *y* and *z* of curve B of FIG. 5; all such pulses are allowed to trigger the second transistor 18 except those which are time coincident with any part of the negative-going gate *g* as shown on curve A of FIG. 5. Curves A, B, and C are drawn to the same time scale, and it will be observed that pulses *x* and *z* occur outside the time interval of the gating pulse *g* whereas pulse *y* on lead 24 occurs during the time interval of the gating pulse *g*. FIG. 3 comprises a circuit in which two circuit portions, each of which is substantially a duplicate of the circuit of FIG. 2 are combined. The gating pulse *g* is generated on lead 46 by applying a timing pulse *p* on lead 33 which is connected by way of resistor 34 to ground 15. The time position of the timing pulse *p* is as shown on the curve C of FIG. 5. Lead 33 is connected by way of capacitor 35, lead 36, rectifier 38, and lead 39 to the emitter 43 of an additional unijunction transistor 42 having bases 44 and 45, base 45 being connected to ground 15, base 44 being connected by way of lead 46 and rectifier 47 to the aforementioned lead 29′, lead 46 also being connected by way of resistor 48 to the positive terminal 49 of a suitable source of potential, not shown, having the other negative terminal thereof connected to ground 15. The aforementioned lead 39 is connected by way of resistor 40 to the positive terminal 41 of an additional source of potential, not shown, having the negative terminal thereof connected to ground 15. The aforementioned lead 36 is also connected by way of resistor 37 to ground 15.

Figure 5:
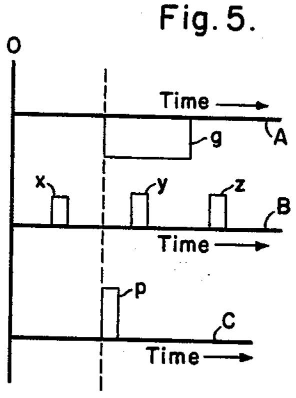
FIG. 5 is a graph illustrating the operation of the apparatus of FIG. 3.

As mentioned in connection with the description of the circuit of FIG. 2, when a trigger pulse of sufficient amplitude, such as any of the pulses *x*, *y*, *z* of curve B of FIG. 5 is applied on lead 24 of FIG. 3, the diode or other rectifier 28 is cutoff and the voltage $V_e$ existing between lead 29′ and ground 15 is free to approach the value of B+ on terminal 32. In the circuit of FIG. 3, a voltage $V_b$ exists between lead 46 and ground 15, and the voltage $V_e$ on lead 29′ cannot substantially exceed the voltage $V_b$ on lead 46 because of the current path through rectifier 47. As the voltage on lead 29, rises when diode 28 is cut off by a pulse on lead 24, it causes the voltage on lead 46 to rise, and if $V_b$ is greater than the critical voltage of transistor 18, the voltage $V_e$ on lead 29′ is allowed to reach this critical voltage and transistor 18 fires. If, however, voltage $V_b$ is maintained at a value less than the critical voltage of transistor 18, the voltage on lead 29′ will be held at this value even during application of a trigger on lead 24. By applying another trigger at lead 33 at appropriate times, the voltage $V_b$ on lead 46 may be controlled and thus the passage of pulses from lead 24 may be controlled. This occurs because a trigger pulse *p* applied to lead 33 cuts off the diode 38 and the voltage on lead 39 and emitter 43 rises toward the value of the B+ voltage at terminal 41. However, before it can reach this value, it crosses the critical emitter voltage for emitter 43 and fires the transistor 42. This action is the same as described for the circuit of FIG. 2. At this moment of the firing of transistor 42, the voltage $V_b$ between the bases 44 and 45 of transistor 42 becomes less than the critical voltage of transistor 18, and so also the voltage on lead 46 to ground, thereby limiting the voltage on lead 29′ to a value which is insufficient to cause transistor 18 to fire. In other words, a direct current path is established from lead 29′ through rectifier 47, lead 46, bases 44 and 45 to ground 15. Accordingly, the blocking of rectifier 28 by the pulse on lead 24 does not cause the voltage on lead 29′ to reach the critical value necessary to fire the transistor 18 so that, in effect, transistor 18 remains cutoff in spite of the application of the pulse *y* to lead 24. However, as described in the operation of the circuit of FIG. 2, after capacitor 35 has discharged through resistors 37 and 34 to the value of the emitter voltage $V_e$ of the fired transistor 42, the diode 38 starts to conduct, placing this circuit in parallel with the emitter circuit of transistor 42. This condition "starves" the emitter circuit returning the transistor 42 to its "unfired" state. The time interval of the gating pulse *g* of curve A of FIG. 5 is thus determined by the time constant of resistors 34 and 37 and capacitor 35. As a result, in this unfired state, the base 44 to ground voltage $V_b$ of transistor 42 assumes a value which is greater than the critical voltage of transistor 18 so that the pulse *z* applied to lead 24 blocks the diode 28 and the voltage on lead 29′ rises towards the voltage $V_b$ until the critical value of transistor 18 is exceeded at which time transistor 18 goes into conduction and pulse *z* is passed to output terminal 9.

Figure 4:
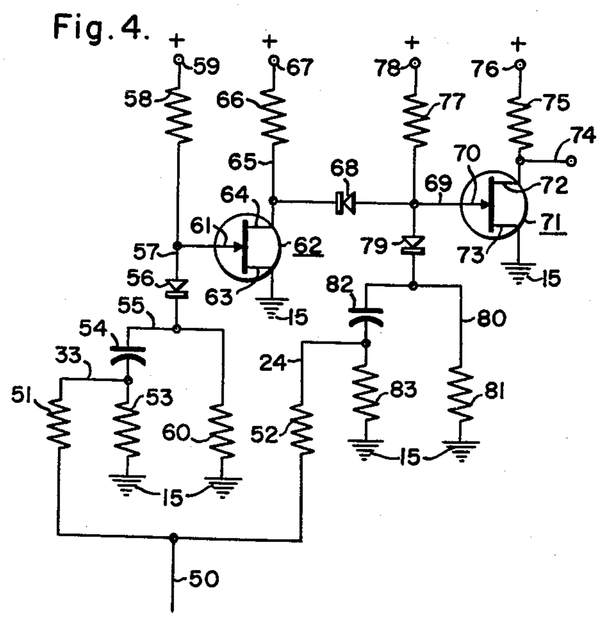
FIG. 4 is a schematic circuit diagram according to a third embodiment of the invention.

Particular reference should be made now to FIG. 4 which is a circuit for selecting and passing pulses applied to lead 50 in accordance with their amplitude, and pulses on lead 50 which fall within a given amplitude range are passed, whereas pulses above a certain amplitude are not passed, and pulses below the lower limit of the amplitude range are not passed. Lead 50 is seen to be connected by way of resistor 51 to lead 33 and also to be connected by way of resistor 52 to lead 24. The remainder of the circuit of FIG. 4 is similar to the circuit of FIG. 3 although the values of the components may be chosen to be different because of the different manner of operation. In FIG. 4, lead 33 is seen to be connected by way of resistor 53 to ground 15 and by way of capacitor 54, lead 55, rectifier 56, lead 57, and resistor 58 to the positive terminal 59 of a suitable source of potential, not shown, having the other terminal thereof connected to ground. Lead 55 is connected by way of resistor 60 to ground 15. The aforementioned lead 57 is connected to the emitter 61 of double base or unijunction transistor 62 having bases 63 and 64, base 63 being connected to ground 15, base 64 being connected by way of lead 65 and resistor 66 to the positive terminal 67 of a suitable source of potential, not shown, having the other terminal thereof connected to ground. Lead 65 is connected by way of rectifier 68 and lead 69 to the emitter 70 of an additional double base unijunction transistor generally designated 71. The transistor 71 also has bases 72 and 73, base 73 being connected to ground 15, base 72 being connected by way of lead 74 and resistor 75 to the positive terminal 76 of a source of potential, not shown, having the other terminal thereof connected to ground. The aforementioned lead 69 is also connected by way of resistor 77 to the positive terminal 78 of a source of potential, not shown, having the other terminal thereof connected to ground, and lead 69 is also connected by way of rectifier 79, lead 80 and resistor 81 to ground 15. Lead 80 is additionally connected by way of capacitor 82, lead 24 and resistor 83 to ground 15.

Figure 6:
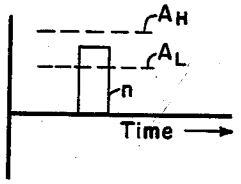
FIG. 6 is a graph illustrating the operation of the apparatus of FIG. 4.

In the operation of the apparatus of FIG. 4, which provides a peak amplitude discriminator for the pulse *n* of FIG. 6, the value of resistor 51 is chosen or adjusted in relation to the value of resistor 53 such that on input lead 50 a pulse amplitude of at least $A_H$ as illustrated in FIG. 6 is required to block rectifier 56 and fire the transistor 62, and the value of resistor 52 is chosen or adjusted in relation to the value of resistor 83 such that on input lead 50 a pulse amplitude of at least $A_L$ as illustrated in FIG. 6 is required to block rectifier 79 and fire transistor 71 while transistor 62 is not fired. While transistor 62 is fired, however, $V_b$, that is, the voltage between lead 65 and ground 15 is of an amplitude less than the critical amplitude for the transistor 71; while transistor 62 is not fired, $V_b$ is of an amplitude at least as great or greater than the critical amplitude of transistor 71. The time constants of the emitter circuits are adjusted such as to reset the transistors in time for the next pulse on lead 50. The output $V_O$ obtained from the aforementioned lead 74 may be used to drive a counter circuit or energize relays or other switching devices.

In operation of the circuit of FIG. 4, a pulse of an amplitude less than $A_L$ applied at lead 50 will cause neither transistor 62 or 71 to fire and no indication is given at lead 74. A pulse of amplitude $A_L$ or greater but not as great as $A_H$ will fire transistor 71 thereby providing a signal $V_O$ at each application of such pulse. A pulse of amplitude greater than $A_H$ will fire transistor 62, which action will limit the voltage on lead 69 and prevent the emitter of transistor 71 from reaching the critical voltage which it would otherwise do because of the trigger at lead 50 and lead 24. The result is that only pulses having an amplitude between $A_L$ and $A_H$ as seen in FIG. 6 will yield an output $V_O$ at output lead 74.

Whereas the invention has been shown and described with respect to some embodiments thereof which give satisfactory results, it should be understood that changes may be made and equivalents substituted without departing from the spirit and scope of the invention.

We claim as our invention:

1. In a gating circuit, in combination, a unijunction transistor, means connected to the unijunction transistor for energizing the base-to-base circuit thereof, circuit means including other energizing means and series-connected rectifier means and first resistor means operatively connected to the emitter of said unijunction transistor, said circuit means normally developing a potential difference across said rectifier means and said first resistor means and applying the potential to said emitter, said potential being normally just insufficient to fire the unijunction transistor, and other circuit means including series-connected capacitor means and second resistor means operatively connected to the junction between said first resistor means and said rectifier means, said capacitor means normally having a potential thereon substantially equal to the potential difference across said first resistor means, said capacitor means upon the application of a pulse of predetermined polarity and amplitude to the other circuit means at the junction between the capacitor means and the second resistor means back-biasing the rectifier means and substantially instantaneously causing the voltage on said emitter to rise to a value which fires the unijunction transistor, said other circuit means providing that the firing of said unijunction transistor is not substantially governed by the width of said pulse, said capacitor means discharging through said first and second resistor means after the cessation of said pulse until the potential across the capacitor means is substantially equal to the potential across the first resistor means.

2. In a gating circuit for a unijunction transistor, in combination, a first stage including a first unijunction transistor and base-to-base energizing circuit means for the first unijunction transistor, potential applying means connected to the emitter of the first unijunction transistor, said potential applying means including rectifier means and normally applying a potential to the first emitter which is less than the predetermined firing potential of the first unijunction transistor, circuit means connected to the rectifier means and constructed and arranged upon the application of a pulse of predetermined polarity to the circuit means to back-bias the rectifier means and cause the voltage on the emitter of the first unijunction transistor to rise to a value which fires the first unijunction transistor, a second stage including a second unijunction transistor, other circuit means for firing the second unijunction transistor upon the application of another pulse of predetermined polarity to said last-named circuit means, and other rectifier means connecting the second unijunction transistor to the emitter of the first unijunction transistor in a manner whereby firing of the second unijunction transistor provides a current path through the other rectifier means which prevents the voltage on the emitter of the first unijunction transistor from rising to said predetermined firing potential when the pulse of predetermined polarity is applied to the circuit means.

3. In a gating circuit for a unijunction transistor, in combination, a first normally unfired unijunction transistor having an emitter and first and second bases, circuit means including rectifier means operatively connected to the first emitter and normally maintaining the first emitter at a voltage below the critical firing voltage of the first transistor, said circuit means being constructed and arranged upon the application of a pulse of predetermined polarity thereto to cause the potential on said emitter to rise to a value which fires the first unijunction transistor, a second normally unfired unijunction transistor, other rectifier means connecting the second transistor to the first transistor, and other circuit means operatively connected to the second unijunction transistor and normally maintaining the voltage on the emitter of the second unijunction transistor at a value below the emitter firing voltage thereby maintaining the second unijunction transistor in an unfired condition, said other circuit means being constructed and arranged upon the application of a pulse of predetermined polarity thereto to fire the second unijunction transistor, the firing of the second unijunction transistor providing a current path through the other rectifier means and second unijunction transistor which prevents the emitter of the first unijunction transistor from attaining a voltage value sufficient to fire the first unijunction transistor.

4. In a unijunction transistor gating circuit for passing pulses selectively in accordance with the amplitude of the pulses, in combination, a first unijunction transistor, said first unijunction transistor having a first emitter, first voltage applying network means including first rectifier means operatively connected to said first emitter and normally maintaining the voltage on the first emitter at a value less than the critical value thereby maintaining the first unijunction transistor in an unfired condition, input circuit means adapted to have pulses of predetermined polarity applied thereto, said input circuit means being connected to said first voltage applying network means whereby input pulses above a certain first predetermined minimum amplitude block the first rectifier means thereby causing the potential on the first emitter to rise to a value which fires the first unijunction transistor, a second unijunction transistor having a second emitter, second voltage applying network means including second rectifier means operatively connected to the second emitter, said second voltage applying network means being operatively connected to said input circuit means whereby a pulse of a second predetermined minimum amplitude greater than said first predetermined minimum amplitude back-biases said second rectifier means and causes the potential on the second emitter to rise to a value which fires the second unijunction transistor, and circuit means including other rectifier means operatively connecting the first unijunction transistor to the second unijunction transistor in a manner whereby the firing of the second unijunction transistor creates a current path through the second unijunction transistor and other rectifier means which prevents the emitter voltage of the first unijunction transistor from rising to the firing potential of the first unijunction transistor.

5. In a unijunction transistor circuit for passing or rejecting pulses applied thereto in accordance with the amplitude of a pulse, in combination, first unijunction transistor means, input circuit means, first voltage applying circuit means operatively connecting the input circuit means to the first unijunction transistor means whereby pulses of at least a first predetermined minimum amplitude cause the first unijunction transistor means to conduct, second unijunction transistor means, second voltage applying circuit means for the second unijunction transistor means, the second voltage applying circuit means being operatively connected to the input circuit means, the input circuit means and second voltage applying circuit means being constructed and arranged whereby the second unijunction transistor means is fired by pulses applied to the input circuit means having at least a second predetermined minimum amplitude greater than the first predetermined minimum amplitude, and other circuit means operatively connecting the first unijunction transistor means and the second unijunction transistor means whereby the firing of the second unijunction transistor means prevents the firing of the first unijunction transistor means.

6. In a unijunction transistor circuit for selecting or rejecting pulses in accordance with variations in the amplitude of the pulses, in combination, first unijunction transistor means, first circuit means operatively connected to the emitter of said first unijunction transistor means and normally maintaining the voltage on the emitter at a value insufficient to fire the first unijunction transistor means, input circuit means operatively connected to the first circuit means, the input circuit means and first circuit means being constructed and arranged whereby pulses of predetermined polarity having at least a first predetermined minimum amplitude fire the first unijunction transistor means, second unijunction transistor means, second circuit means operatively connected to the second unijunction transistor means and normally maintaining the voltage on the emitter of the second unijunction transistor means at a value insufficient to fire the second unijunction transistor means, said second circuit means being operatively connected to the input circuit means, the input circuit means and second circuit means being constructed and arranged whereby pulses of said predetermined polarity having a second predetermined minimum amplitude greater than the first minimum amplitude cause the firing of the second unijunction transistor means, and additional circuit means operatively connecting the second unijunction transistor means to the first unijunction transistor means in a manner whereby the firing of the second unijunction transistor means prevents the firing of the first unijunction transistor means.

7. A gating circuit comprising, in combination, a first unijunction transistor including a first emitter, first circuit means including a first rectifier, said first circuit means being adapted to be connected to a first source of direct current potential to be energized therefrom and to normally produce a voltage on the emitter of said first unijunction transistor which is less than the amplitude required to fire said first unijunction transistor, a second unijunction transistor, rectifier means connecting said second unijunction transistor to the emitter of said first unijunction transistor, and other circuit means operatively connected to said second unijunction transistor and adapted to have a positive pulse applied thereto, said first circuit means being adapted to have a different positive pulse applied thereto, said first circuit means when a pulse is applied thereto and in the absence of a pulse applied to said other circuit means firing said first unijunction transistor, a pulse applied to said other circuit means firing said second unijunction transistor, the firing of the second unijunction transistor preventing the voltage on the emitter of said first unijunction transistor from rising to a value sufficient to fire said first unijunction transistor when a pulse is applied to said first circuit means.

8. A gating circuit comprising, in combination, circuit means including a first resistor, a rectifier, and a second resistor connected in series in the order named, said rectifier being poled in a preselected direction, said circuit means being adapted to be connected to a source of direct current potential of predetermined amplitude, said circuit means including a common circuit point, the junction between the first resistor and said rectifier being normally at a predetermined voltage having a predetermined potential difference with respect to said common circuit point, a unijunction transistor having an emitter, a first base, and a second base, means operatively connecting said second base to a source of direct current potential, means operatively connecting said first base to said common circuit point, means connecting said emitter to the junction between said first resistor and said rectifier, said predetermined voltage being less than the critical firing voltage of said unijunction transistor, a capacitor having one terminal thereof connected to the junction between said rectifier and said second resistor, a third resistor operatively connecting the other terminal of said capacitor to said common circuit point, and means for applying a pulse of predetermined amplitude and polarity to the junction between said capacitor and said third resistor, said pulse when applied substantially instantaneously back-biasing said rectifier and causing the voltage on said emitter to increase substantially instantaneously to a value which fires said unijunction transistor, said pulse while applied to said capacitor charging said capacitor, the charge on said capacitor maintaining the rectifier back-biased for a predetermined time interval after the cessation of said pulse and maintaining the unijunction transistor in a conductive condition.

9. A gating circuit comprising, in combination, first circuit means including a first resistor, a rectifier and a second resistor connected in series in the order named, said second resistor being connected to a common circuit point, said first resistor being adapted to be connected to a source of direct current potential, said rectifier being poled in a preselected manner whereby current from said source flows through said first and second resistors causing voltage drops thereacross, a unijunction transistor having an emitter, a first base, and a second base, means connecting said second base to an additional source of direct current potential, additional circuit means connecting said first base to said common circuit point, said emitter being connected to the junction between said first resistor and said rectifier, and other circuit means including a third resistor and a capacitor connecting said common circuit point to the junction between said rectifier and said second resistor, the junction between said third resistor and said capacitor being adapted to have a pulse of predetermined polarity applied thereto, the voltage drops across said first and second resistors in the absence of a pulse providing a voltage on said emitter less than the critical firing voltage of said unijunction transistor, said pulse while applied back-biasing said rectifier and causing the voltage on said emitter to substantially instantaneously increase to a value which fires said unijunction transistor, the firing of the unijunction transistor being substantially independent of the width of said pulse.

10. A gating circuit comprising, in combination, circuit means including a first resistor, a first rectifier and a second resistor connected in series in the order named, the first rectifier being poled in a preselected manner, a first unijunction transistor having an emitter and first and second bases, additional circuit means including energizing means connected to the first and second bases, said emitter being connected to the junction between said first resistor and said first rectifier, said circuit means being adapted to be connected to a source of direct current potential of predetermined amplitude, current flows through the first and second resistors causing voltage drops thereacross whereby the voltage on said emitter is normally less than the critical firing voltage of said first unijunction transistor, other circuit means operatively connected to said first-named circuit means and adapted to have a pulse of predetermined polarity applied thereto, said other circuit means while the pulse is applied thereto back-biasing said first rectifier and causing the voltage on said emitter to increase to a value which fires said first unijunction transistor, further circuit means including a third resistor, a second rectifier and a fourth resistor connected in series in the order named, said second rectifier being poled in a preselected direction, a second unijunction transistor having an emitter and a pair of bases, said last-named emitter being connected to the junction between the third resistor and the second rectifier, a third rectifier poled in a preselected manner and connecting one of said pair of bases to the emitter of said first unijunction transistor, said further circuit means being adapted to be connected to a source of direct current potential whereby current flows through the third and fourth resistors causing voltage drops thereacross and providing a voltage applied to the emitter of said second unijunction transistor which is normally less than the value required to fire said second unijunction transistor, and adjunct circuit means adapted to have a gating pulse of predetermined polarity applied thereto, said gating pulse while applied to said adjunct circuit means back-biasing said second rectifier and causing the potential on the emitter of said second unijunction transistor to increase to a value which fires said second unijunction transistor, the firing of said second unijunction transistor causing current to flow through the third rectifier thereby reducing the voltage on the emitter of said first unijunction transistor to a value whereat a pulse applied to said other circuit means no longer fires said first unijunction transistor.

References Cited in the file of this patent

UNITED STATES PATENTS

| | | |
|---|---|---|
| 2,531,076 | Moore | Nov. 21, 1950 |
| 2,657,318 | Rack | Oct. 27, 1953 |

OTHER REFERENCES

E. Keonjian and J. J. Suran: "Unijunction Transistor Forms Flip-Flop," pages 165 to 167, Electronics, Sept. 1, 1957.